Figure 1:
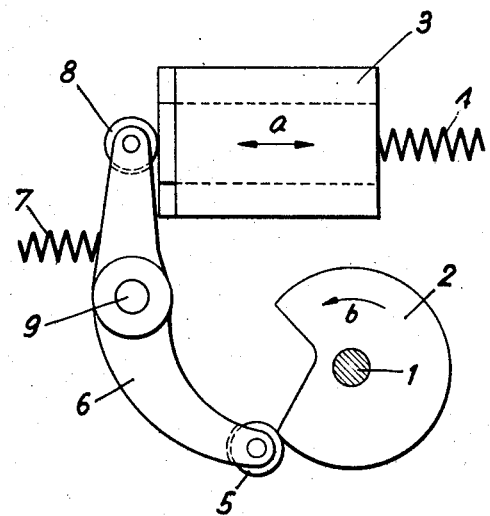

April 20, 1965 P. A. KUMMER 3,179,763
ELECTRICAL SWITCHING MEANS PROVIDING A SAFETY
FEATURE IN AUTOMATIC MACHINERY
Filed Feb. 24, 1961

United States Patent Office 3,179,763
Patented Apr. 20, 1965

3,179,763
ELECTRICAL SWITCHING MEANS PROVIDING A SAFETY FEATURE IN AUTOMATIC MACHINERY
Pierre André Kummer, Tramelan, Switzerland, assignor to Kummer Freres S.A. Fabrique de Machines, Tramelan, Switzerland, a joint-stock company
Filed Feb. 24, 1961, Ser. No. 91,397
Claims priority, application Switzerland, Feb. 26, 1960, 2,186/60
6 Claims. (Cl. 200—61.41)

This invention relates to control mechanisms for automatic lathes and in particular to control mechanisms comprising a movable member, a controlling member normally in abutting engagement with said movable member to control the displacements thereof, and actuating means to keep said controlling member in operative condition.

In the control mechanism of this particular type known in the art the controlling members are generally constituted by cams and the movable members by tool slides or similar units which are moved under the control of said cams by means of motion transmitting means such as levers. In these known control mechanisms said motion transmitting means are provided with followers such as rollers or fingers kept in abutting engagement with controlling cams by spring means acting either on the lever means themselves or on the tool slides or the similar units. The controlling cams are usually moving said tools toward their working positions and said spring means acting either on the tool slides or on the intermediate motion transmitting levers accordingly urge the tools back toward their resting positions. With the lathes provided for machining relatively big workpieces it may now occur that a return spring acting on the tool slide cannot bring the latter back in its resting position, thus causing more or less important damages to some lathe parts, especially when the lathe is proceeding with its operating cycle.

One object of the invention is therefore to provide a control mechanism of the kind mentioned above with a safety device avoiding said drawbacks.

It is also an object of the invention to use an electric circuit as safety device, said circuit comprising the movable member and the controlling member of the control mechanism, said circuit energizing holding means causing the controlling member to stop for instance when a tool unduly remains engaged with a workpiece after its operation.

A further object of the invention is to use a relay as holding means, said relay preferably acting on switch means provided on the feeding main of the means actuating said controlling member.

Still further objects of the invention will become apparent in the course of the following description.

One embodiment of the control mechanism according to the invention is represented diagrammatically and by way of example in the annexed drawings.

Figure 2:
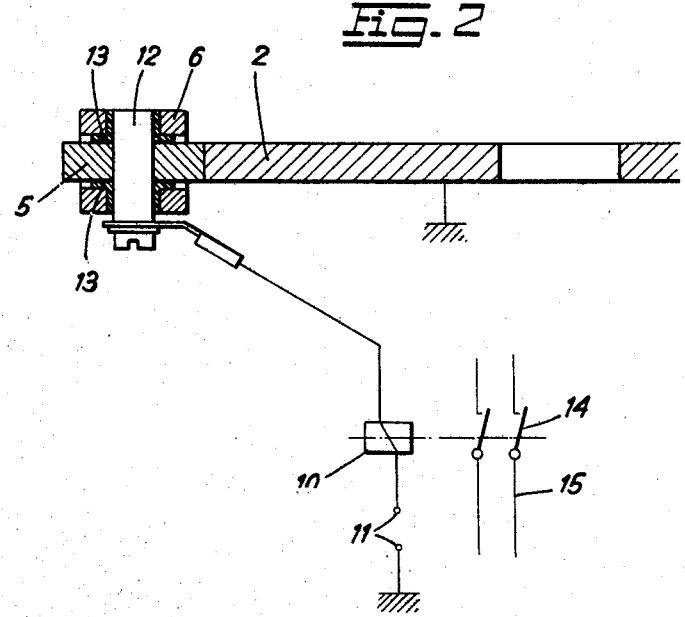

In the drawings:

FIG. 1 is an elevational view of some parts of an automatic lathe provided with the control mechanism according to the invention, and FIG. 2 is a part sectional view on a larger scale of some elements of FIG. 1 showing parts of the safety device.

The automatic lathe represented in the drawings and provided with the control mechanism embodying the invention, comprises a rotating camshaft 1 to control its operation. A cam 2 is rigidly fixed on to camshaft 1 to control in particular a slide 3 carrying one or more tools (not shown). The slide 3 is set under the action of a thrust spring 4 normally keeping a following roller 5 mounted for rotary motion on a motion transmitting lever 6 in abutting engagement with cam 2. A second thrust spring 7, much weaker than spring 4, always keeps a roller 8 mounted for rotary motion on the other end of lever 6 in abutting engagement with slide 3.

The cam 2 thus causes the slide 3 to move to and fro in the directions of arrows $a$ by means of the rocking lever 6 which is pivotally mounted around a fixed stud 9. Said motions of slide 3 occur upon a rotary motion of cam 2 in the direction of arrow $b$. During the motion of cam 2 the return spring 4 normally keeps the roller 5 in abutting engagement with this cam 2. The latter can thus be cut so that a tool carried by slide 3, makes a well determined working operation on a workpiece driven by a spindle (not shown) of the lathe.

In the lathes referred to above, the camming surfaces of cam 2 are usually arranged so as to move slide 3 against the action of spring 4 when the tool carried by said slide is working and moves toward its outmost position in this direction. Once said tool has ended its operation, the cam 2 permits the lever 6 to rock around its stud 9 and the slide 3 to move under the action of its return spring 4.

Should now, however, the tool carried by slide 3 happen to remain incidentally engaged with the workpiece, the roller 8 of lever 6 would thus also remain in abutting engagement with said slide under the action of spring 7 and cam 2 would accordingly leave the roller 5.

The safety device represented in FIG. 2 comprises holding means constituted by a relay 10 the coil of which is connected in an electric circuit fed by a source of direct or alternating current connected to the terminals 11. One terminal of said source is grounded through the mass of the lathe, whereas the other terminal of the source of electric energy is connected to one terminal of the coil of relay 10. The other terminal of this coil is connected itself to an axle 12 around which the roller 5 is mounted for rotary motion at the end of lever 6. Insulating means such as sleeves 13 provided with flat flanges are inserted between axle 12, roller 5 and lever 6 to insulate said roller from the mass of the lathe which cam 2 belongs to.

Relay 10 is accordingly energized as long as roller 5 remains in abutting engagement with cam 2. However, as soon as the latter accidentally leaves said roller or as soon as a piece of dirt, tow wastes and the like come between cam 2 and roller 5 thus jeopardizing the precision of the slide displacements, the energizing circuit of relay 10 is broken.

FIG. 2 shows that the coil of relay 10 acts on switch means 14 provided to keep the cam 2 rotating. Said switch means are indeed connected to mains 15 supplying the conventional motor (not shown) normally driving camshaft 1. As long as relay 10 is energized the switch 14 is closed, but as soon as the energizing circuit of relay 10 is interrupted between roller 5 and cam 2, the switch 14 opens and the motor driving cam 2 stops.

The safety device described above is especially designed for an automatic lathe the camshaft 1 of which is driven by a particular motor which does not at all depend on the drive of the lathe spindle gripping the workpieces and driving the same. In this case leads 15 obviously constitute the mains feeding the motor driving the camshaft. A breaking of the energizing circuit of relay 10 accordingly causes the motor driven camshaft 1 to stop thus interrupting every operation of the lathe except the rotation of the spindle. Damages for the workpiece which is being machined as well as for the tool still engaged with said workpiece and the lathe members carrying said tool are consequently completely avoided.

With an automatic lathe having a camshaft driven by the main motor of the lathe which also drives the lathe spindle together with the workpiece, the relay 10 can act on the conventional clutch means inserted in lathes of this type between said main motor and the camshaft 1 to disconnect the latter from said motor, the relay 10 thereby acting on said clutch means either directly by acting on a clutch member or indirectly by acting for instance on a valve belonging to hydraulic or pneumatic means actuating the said clutch member.

While one embodiment of the invention has been described above, it will be understood that various changes in the sizes, shape and arrangement of parts could be resorted to within the scope of the appended claims without departing from the spirit of the invention or sacrificing the advantages thereof.

I claim:

1. In an automatic lathe, a safety device comprising an automatic tool control means and means to control the energization thereof, said automatic tool control means comprising: a driving means, a cam connected to and driven by said driving means, a tool carrying means, a lever means mounted therebetween for transmitting the movement of said cam to said tool carrying means, a cam follower mounted on one end of said lever and electrically insulated therefrom, biasing means acting on said lever means to maintain said cam follower in mechanical and thereby electrical contact with said cam, said energization means comprising: a normally energized relay, normally closed relay contacts energizing said driving means, said cam and said cam follower being of electric constructive material and being contacts in the energization path for said relay whereby the breaking of contact between said cam and cam follower will cause said relay to be deenergized thereby deenergizing said driving means.

2. In an automatic lathe, a cutting tool carrying means mounted for movement toward and away from a workpiece, resilient means biasing said carrying means away from the workpiece, a cam, a follower for transmitting thrust in compression between said cam and said carrying means to overcome the bias of said resilient means and move the carrying means towards and into engagement with, a workpiece, a cutting tool operating circuit, and means responsive to a break in the compressive contact between said cam and follower for deenergizing said circuit.

3. The invention according to claim 2 wherein said means responsive to a break in the compressive contact between said cam and follower comprises a relay normally energized through the contact between said cam and said follower, contacts of said relay being connected between a source of power and a means for driving said cam, said contacts being normally closed.

4. In an automatic lathe, a cutting tool carrying means mounted for movement towards and away from a workpiece; resilient means biasing said carrying means away from the workpiece, a cam; a follower for transmitting thrust in compression between said cam and said carrying means to overcome the bias of said resilient means and move the carrying means towards and in engagement with a workpiece, a contact member forming a part of said follower and normally in compressive contact with said cam, means for electrically insulating said contact member from said follower, a lathe operating circuit extending through said contact member and said cam, and means responsive to a break in the compressive contact between said cam and said follower for deenergizing said circuit whereby if the tool sticks in the work and the resilient means fails to dislodge it an open circuit condition will result.

5. The invention according to claim 4 wherein said responsive means comprises a normally energized relay.

6. In an automatic lathe, a cutting tool carrying means mounted for movement towards and away from a workpiece; resilient means biasing said carrying means away from the workpiece, a cam, a bell crank pivotally mounted between and in engagement with said carrying means and said cam for transmitting thrust in compression between said cam and said carrying means to overcome the bias of said resilient means and move the carrying means towards and into engagement with a workpiece, a contact member forming a part of said bell crank and in compressive contact with said cam, means for electrically insulating said contact member from said bell crank, a lathe operating circuit extending through said contact member and said cam, means responsive to a break in the compressive contact between said contact member and said bell crank for deenergizing said circuit.

References Cited by the Examiner
UNITED STATES PATENTS

| 1,902,228 | 3/33 | Garretson | 317—135 |
| 2,065,820 | 12/36 | Mellon | 317—135 |

FOREIGN PATENTS

| 731,051 | 6/55 | Great Britain. |

BERNARD A. GILHEANY, *Primary Examiner.*
LLOYD McCOLLUM, *Examiner.*